(12) United States Patent
Cole (10) Patent No.: US 8,596,569 B2
(45) Date of Patent: Dec. 3, 2013

(54) FRONT ELECTRIC ROTOR HELICOPTER

(76) Inventor: Jason Everett Cole, Westland, MI (US)

(*) Notice: Subject to any disclaimer, the term of this patent is extended or adjusted under 35 U.S.C. 154(b) by 249 days.

(21) Appl. No.: 13/200,558

(22) Filed: Sep. 26, 2011

(65) Prior Publication Data

US 2012/0305699 A1    Dec. 6, 2012

Related U.S. Application Data

(60) Provisional application No. 61/493,848, filed on Jun. 6, 2011.

(51) Int. Cl.
*B64C 27/82* (2006.01)
(52) U.S. Cl.
USPC .................. 244/17.21; 244/58; 244/17.19
(58) Field of Classification Search
USPC .................. 244/17.11, 17.19, 17.21, 58
See application file for complete search history.

(56) References Cited

U.S. PATENT DOCUMENTS

| 2,979,968 | A  | * | 4/1961 | Beurer ............... 74/665 GA |
| 3,455,182 | A  | * | 7/1969 | Kelley ................... 74/661 |
| 7,363,120 | B2 | * | 4/2008 | Aubourg ................. 701/3 |
| 2010/0044498 | A1 | * | 2/2010 | Palcic et al. ......... 244/17.21 |

* cited by examiner

*Primary Examiner* — Timothy D Collins
*Assistant Examiner* — Nicholas McFall (57) ABSTRACT

My invention is a helicopter having a front electric anti-torque rotor for the purpose of having a mechanically driven pusher propeller at the rear for increasing forward speed. Speed has been a limiting factor in vertical flight. Various designs have been conceived by people around the world to make helicopters go faster. My design is a high speed single rotor helicopter design that uses a gas-electric hybrid front electric anti-torque rotor system to allow for a mechanically driven pusher propeller at the rear. As the helicopter goes forward, the front electric anti-torque gives control and the mechanically driven pusher propeller at the rear gives increased forward speed. The intent of the design is to make a high speed single rotor helicopter design.

1 Claim, 3 Drawing Sheets

FRONT ELECTRIC ROTOR HELICOPTER

CROSS-REFERENCE TO RELATED APPLICATIONS

This applications claims priority benefit of provisional patent application No. 61/493,848, filed 6 Jun. 2011.

TECHNICAL FIELD

The invention relates to aeronautics in the area of vertical flight. Igor Sikorsky invented the tail rotor helicopter. The tail rotor provided control for the single rotor helicopter during vertical flight. This invention uses an electric front rotor helicopter design to allow for a mechanical pusher propeller at the rear to increase the forward speed of the helicopter. The pusher propeller at the rear of the single rotor helicopter is optional. Turn the pusher propeller on for extra speed or turn it off so virtually all the engine power will go into the lift/efficiency of the helicopter. This front electric rotor helicopter design with a mechanical pusher propeller at the rear serves as the basis for a high speed single rotor helicopter design.

BACKGROUND OF THE INVENTION

The Background for this invention is aeronautics concerning the anti-torque rotor of the single rotor helicopter. The anti-torque rotor of a helicopter is used to help control the helicopter during flight. Conventional control for a single rotor helicopter involves the use of a rear anti-torque rotor to give stability and control. That rear anti-torque rotor is mechanically driven from the engine. As vertical flight technology has progressed there has been a need to make helicopters fly faster in the forward direction. Many designs have been put forth from using wings and jet engines to make the helicopter go faster to using co-axial lift rotor with a pusher propeller at the rear to increase speed. My invention uses a single rotor helicopter that has a front electric anti-torque rotor on the nose of the helicopter so a mechanically driven pusher propeller can be at the rear to increase the forward speed of the helicopter.

BRIEF SUMMARY OF THE INVENTION

This invention is a front electric rotor helicopter design to allow for a mechanical pusher propeller at the rear for increase forward speed. The gas engine of the single rotor helicopter is also used to spin an electric generator to power the front electric anti-torque rotor. By having this gas-electric hybrid front electric rotor system allows for a mechanically driven pusher propeller at the rear. This helicopter design is intended to make the single rotor helicopter much faster in forward speed than a conventional tail rotor helicopter.

DETAILED DESCRIPTION OF THE INVENTION

Figure 1:
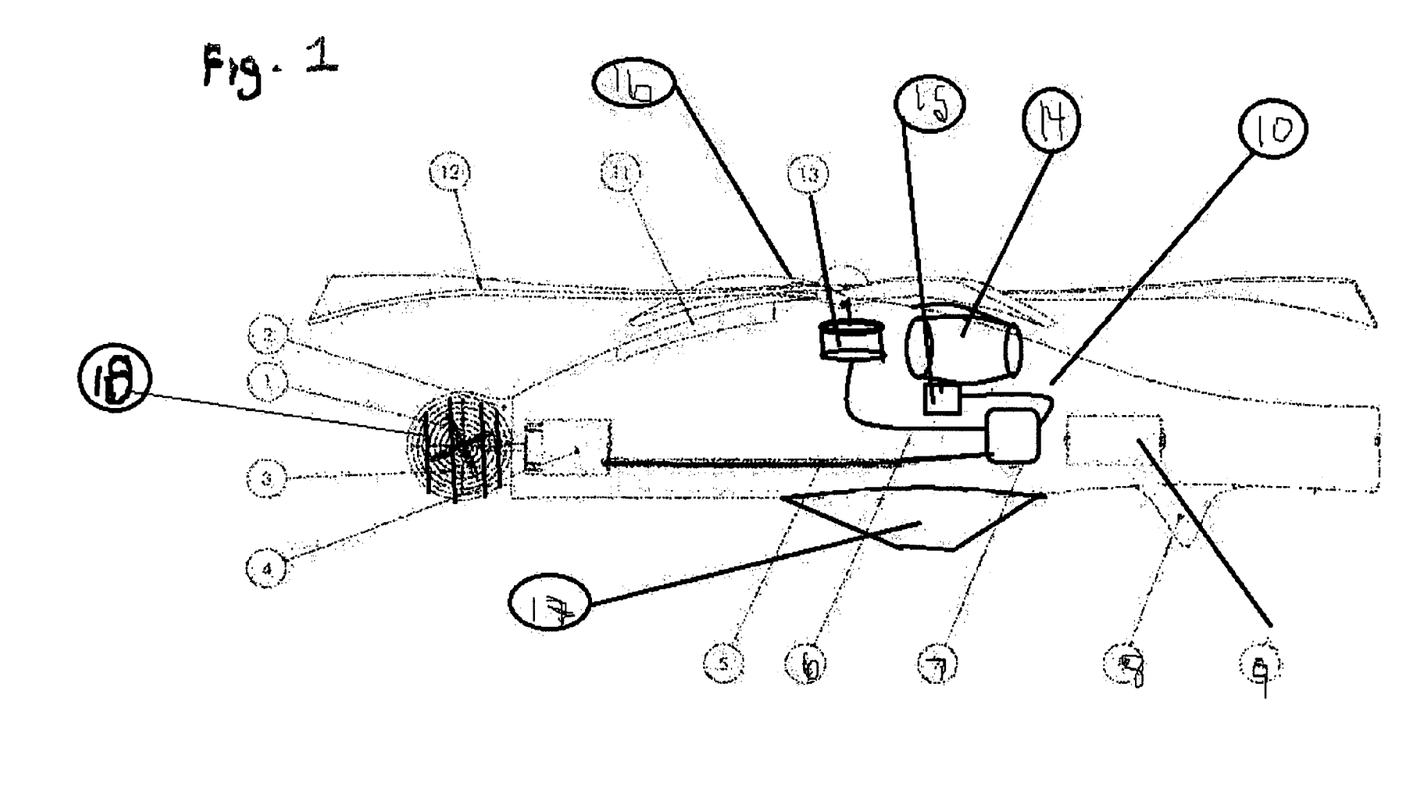
FIG. 1: is a side view of the invention.
Figure 2:
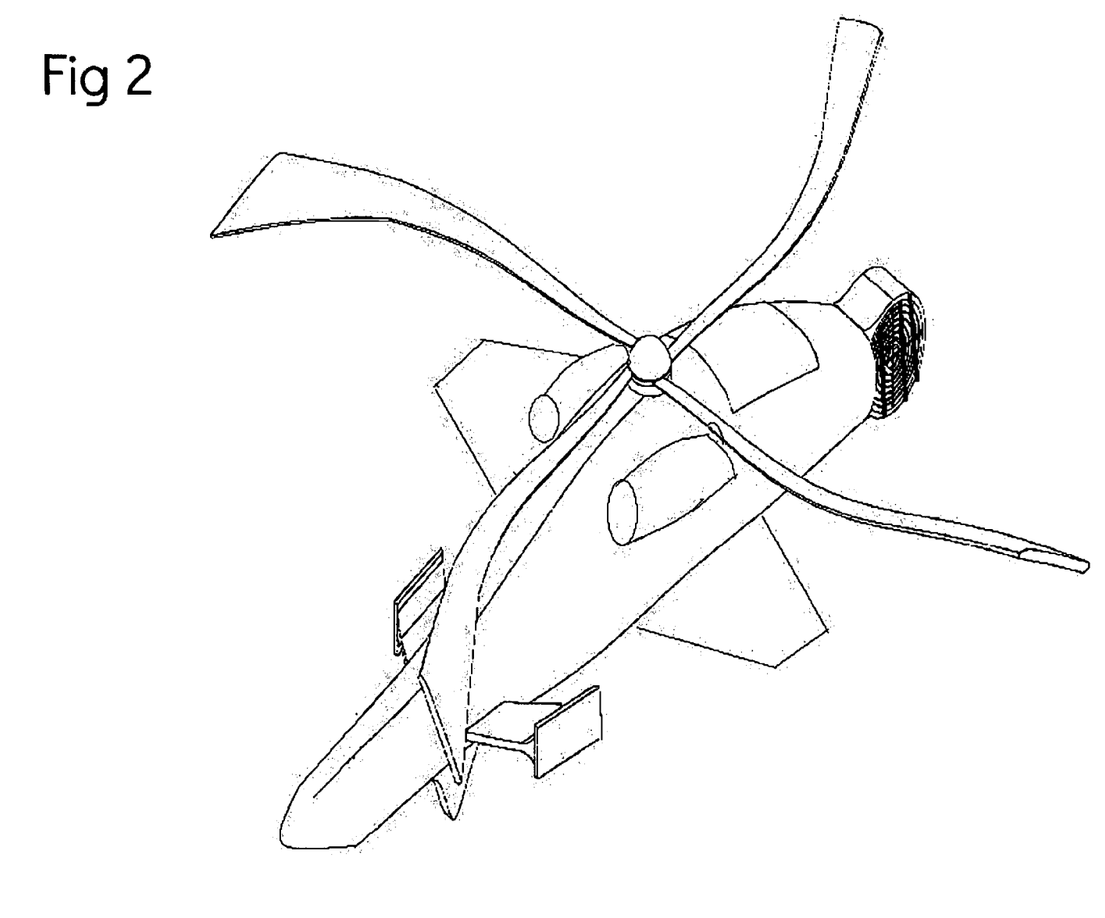
FIG. 2: is perspective view of the invention.
Figure 3:
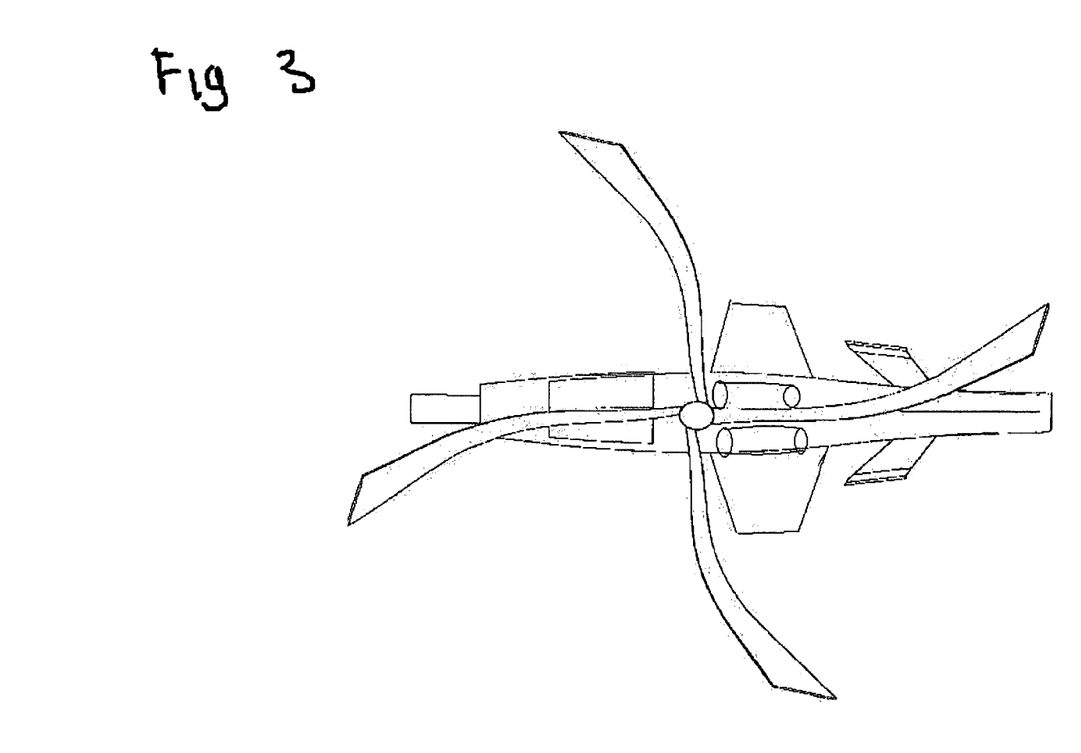
FIG. 3: is a top view of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claim.

The conventional configuration of a helicopter includes a primary lift rotor to provide lift for the helicopter, and a tail rotor to counteract the torque generated by the rotation of the primary lift rotor. The primary lift rotor is mounted on a shaft above the fuselage, or body, of the helicopter. As the primary lift rotor rotates, airflow is created over the blades of the primary lift rotor, resulting in lift. Typically, tail rotor is employed to produce thrust acting in a direction transverse to the long axis of the fuselage to prevent the fuselage from rotating. By increasing or decreasing the thrust produced by the tail rotor, the pilot can steer the helicopter to the left or right.

In the design of conventional helicopters, the tail rotor is powered by the same primary engine that powers the primary lift rotor, thereby preventing the full power capacity of the primary engine from being dedicated to lifting the helicopter. The present invention solves this problem by incorporating an anti-torque rotor which has an auxiliary power source that is independent of the primary engine.

As in a conventional helicopter configuration, the primary lift rotor may be mounted above the fuselage and may be powered by the primary engine. Unlike conventional helicopter configuration, the present invention may incorporate an anti-torque rotor that may be powered by an auxiliary engine that may be independent of the primary engine. The auxiliary engine may be a fuel burning engine, an electric motor, or any useful means of providing power to the anti-torque rotor.

In the exemplary embodiment shown in Figure, the anti-torque rotor may be mounted at the front of the fuselage. As an option, a pusher propeller may be mounted at the aft end of the fuselage to provide additional forward thrust to the helicopter. The pusher propeller may be powered by its own dedicated pusher engine or, alternatively, by the auxiliary engine.

In an alternative exemplary embodiment, the anti-torque rotor may be mounted at the rear of the fuselage.

It should be understood, of course, that the foregoing relates to exemplary embodiments of the invention and that modifications may be made without departing from the spirit and scope of the invention as set forth in the following claim.

DESCRIPTION OF REFERENCE NUMBERS

1. Front anti-torque rotor blades
2. Front hub around anti-torque rotor
3. Mesh air grill on the left & right side of front rotor
4. Electric motor
5. Electrical wire from electrical generator to front electric rotor
6. Electrical generator
7. Gears
8. Tail fin
9. Shaft
10. Rear pusher propeller
11. Front cockpit glass
12. Primary lift blade
13. Primary lift engine.

I claim:
1. A helicopter comprising:
a fuselage;
two tail fins protruding laterally from the rear of the fuselage;
a primary lift rotor mounted above the fuselage powered by a primary engine and;
an electrical generator powered by the primary engine;

an electric motor mounted in the forward section of the fuselage;
electrical wires connecting the electrical generator and the electric motor;
an anti-torque rotor mounted on the front of fuselage with a plurality of rotor blades surrounded by left and right mesh air grills powered by the electric motor;
a shaft;
a rear pusher propeller driven by the primary engine via the shaft.

* * * * *

UNITED STATES PATENT AND TRADEMARK OFFICE
CERTIFICATE OF CORRECTION

PATENT NO.       : 8,596,569 B2
APPLICATION NO.  : 13/200558
DATED            : December 3, 2013
INVENTOR(S)      : Cole Page 1 of 5

It is certified that error appears in the above-identified patent and that said Letters Patent is hereby corrected as shown below:

Delete Title page, and replace with new Title page. (attached)

Delete drawing sheets 1-3, and replace with new drawing sheets 1-3. (attached)

Signed and Sealed this
Eighteenth Day of February, 2014

Michelle K. Lee
*Deputy Director of the United States Patent and Trademark Office*

(12) United States Patent
Cole (10) Patent No.: US 8,596,569 B2
(45) Date of Patent: Dec. 3, 2013

(54) FRONT ELECTRIC ROTOR HELICOPTER (76) Inventor: Jason Everett Cole, Westland, MI (US)

(*) Notice: Subject to any disclaimer, the term of this patent is extended or adjusted under 35 U.S.C. 154(b) by 249 days.

(21) Appl. No.: 13/200,558

(22) Filed: Sep. 26, 2011

(65) Prior Publication Data
US 2012/0305699 A1   Dec. 6, 2012

Related U.S. Application Data

(60) Provisional application No. 61/493,848, filed on Jun. 6, 2011.

(51) Int. Cl.
*B64C 27/82* (2006.01)
(52) U.S. Cl.
USPC .............. 244/17.21; 244/58; 244/17.19
(58) Field of Classification Search
USPC ............... 244/17.11, 17.19, 17.21, 58
See application file for complete search history.

(56) References Cited

U.S. PATENT DOCUMENTS

| | | | |
|---|---|---|---|
| 2,979,968 A * | 4/1961 | Beurer | 74/665 GA |
| 3,455,182 A * | 7/1969 | Kelley | 74/661 |
| 7,363,120 B2 * | 4/2008 | Aubourg | 701/3 |
| 2010/0044498 A1 * | 2/2010 | Palcic et al. | 244/17.21 |

* cited by examiner

*Primary Examiner* — Timothy D Collins
*Assistant Examiner* — Nicholas McFall (57) ABSTRACT

My invention is a helicopter having a front electric anti-torque rotor for the purpose of having a mechanically driven pusher propeller at the rear for increasing forward speed. Speed has been a limiting factor in vertical flight. Various designs have been conceived by people around the world to make helicopters go faster. My design is a high speed single rotor helicopter design that uses a gas-electric hybrid front electric anti-torque rotor system to allow for a mechanically driven pusher propeller at the rear. As the helicopter goes forward, the front electric anti-torque gives control and the mechanically driven pusher propeller at the rear gives increased forward speed. The intent of the design is to make a high speed single rotor helicopter design.

1 Claim, 3 Drawing Sheets